(12) United States Patent
Hwang et al.

(10) Patent No.: US 9,523,837 B2
(45) Date of Patent: Dec. 20, 2016

(54) LENS MODULE

(71) Applicants: SINTAI OPTICAL (SHENZHEN) CO., LTD., Shenzhen (CN); ASIA OPTICAL INTERNATIONAL LTD., Tortola (GB)

(72) Inventors: Duen-Kwei Hwang, Taichung (TW); Ming-Chih Chang, Taichung (TW)

(73) Assignees: SINTAI OPTICAL (SHENZHEN) CO., LTD., Shenzhen (CN); ASIA OPTICAL INTERNATIONAL LTD., Tortola, B.V.I. (GB)

( * ) Notice: Subject to any disclaimer, the term of this patent is extended or adjusted under 35 U.S.C. 154(b) by 150 days.

(21) Appl. No.: 14/611,955

(22) Filed: Feb. 2, 2015

(65) Prior Publication Data

US 2015/0253535 A1 Sep. 10, 2015

(30) Foreign Application Priority Data

Mar. 6, 2014 (TW) ............... 103107715 A (51) Int. Cl.
*G02B 7/10* (2006.01)
*G03B 7/10* (2006.01)
*G02B 7/04* (2006.01)
*G02B 7/00* (2006.01)

(52) U.S. Cl.
CPC ............... *G02B 7/102* (2013.01); *G03B 7/10* (2013.01); *G02B 7/006* (2013.01); *G02B 7/04* (2013.01)

(58) Field of Classification Search
CPC .......... G02B 7/006; G02B 7/04–7/105; G03B 2205/0053–2205/0084; G03B 7/10
USPC ............... 348/195, 208.11, 240.1, 259, 290,348/333.08, 335, 342
See application file for complete search history.

(56) References Cited

U.S. PATENT DOCUMENTS

| | | | | |
|---|---|---|---|---|
| 5,534,696 | A * | 7/1996 | Johansson | G02B 23/12 250/330 |
| 5,982,423 | A * | 11/1999 | Sekiguchi | H04N 5/2254 250/330 |
| 8,077,200 | B2 * | 12/2011 | Zhao | G03B 17/12 348/136 |
| 2002/0163586 | A1* | 11/2002 | Noguchi | H04N 5/2254 348/342 |
| 2010/0134878 | A1* | 6/2010 | Wu | G02B 5/208 359/353 |
| 2012/0062789 | A1* | 3/2012 | Sasaki | G03B 17/00 348/373 |

(Continued)

*Primary Examiner* — Hung Lam
(74) *Attorney, Agent, or Firm* — Lynette Wylie; Apex Juris, pllc.

(57) ABSTRACT

A lens module includes a driving device, an image sensing device, a lens group frame, and an infrared filter. The driving device has a lens barrel for an optical signal passing through. The image sensing device is on a path of the optical signal to convert the optical signal into an electric signal. The lens group frame is provided in the lens barrel, and has a main body, which is driven by the driving device to be moved between a first position and a second position, and a lens holder, which is pivotally connected on the main body and is swung between a third position and a fourth position when the main body is respectively at the first and the second positions. The infrared filter is provided on the lens holder, and is precisely aligned with the image sensing device when the lens holder is at the fourth position.

13 Claims, 8 Drawing Sheets

(56) References Cited

U.S. PATENT DOCUMENTS

2012/0086849 A1\* 4/2012 Wada ................... G02B 26/007
                                                  348/344
2012/0105984 A1\* 5/2012 Umezu ................. G02B 7/102
                                                  359/819

\* cited by examiner

LENS MODULE

BACKGROUND OF THE INVENTION

1. Technical Field

The present invention relates generally to an optical lens, and more particularly to a lens module.

2. Description of Related Art

For those optical image devices such as cameras or camcorders that are usually carried on the body, the size and weight of zoom lenses are greatly reduced with the help of recent advances in imaging technology. In addition to miniature and lightweight, such optical image devices always pursue better optical performance for achieving higher resolution and contrast. In other words, miniature and high optical performance are two key design elements of zoom lenses nowadays.

For miniature, there is one kind of lens module, in which the lens and the zooming mechanism can be collapsed into the case of an optical image device. However, there is still room for improvement.

BRIEF SUMMARY OF THE INVENTION

In view of the above, the primary objective of the present invention is to provide a lens module, which is applied with an infrared filter and compatible with lens group composed of many (even more than 10) single lenses, but still able to reduce the thickness of a collapsed lens, and therefore achieves the purpose of miniature optical image devices.

The lens module provided in the present invention includes a driving device, an image sensing device, a lens group frame, and an infrared filter. The driving device has at least a lens barrel for an optical signal passing through; the image sensing device is provided on a side of the driving device, wherein the image sensing device is on a path of the optical signal to convert the optical signal into an electric signal accordingly; the lens group frame is provided in the lens barrel, wherein the lens group frame has a main body, which is driven by the driving device to be moved between a first position and a second position, and a lens holder pivotally connected to the main body; the lens holder is moved between a third position and a fourth position as the main body is moved between the first position and the second position; the infrared filter is provided on the lens holder, wherein when the lens holder is at the fourth position, the infrared filter is precisely aligned with the image sensing device to filter out infrared rays within the optical signal which is projected to the image sensing device.

Whereby, with the aforementioned design to pivotally shift the infrared filter, the total thickness of arranged single lenses can be effectively reduced when collapsed. As a result, optical image devices applied with the lens module can be smaller and thinner.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

As shown in FIG. 1 to FIG. 7, the lens module of the preferred embodiment of the present invention includes an image sensing device 10, a driving device, a lens group frame 30, a first lens group G1, a second lens group G2, and an infrared filter FT.

Figure 1:
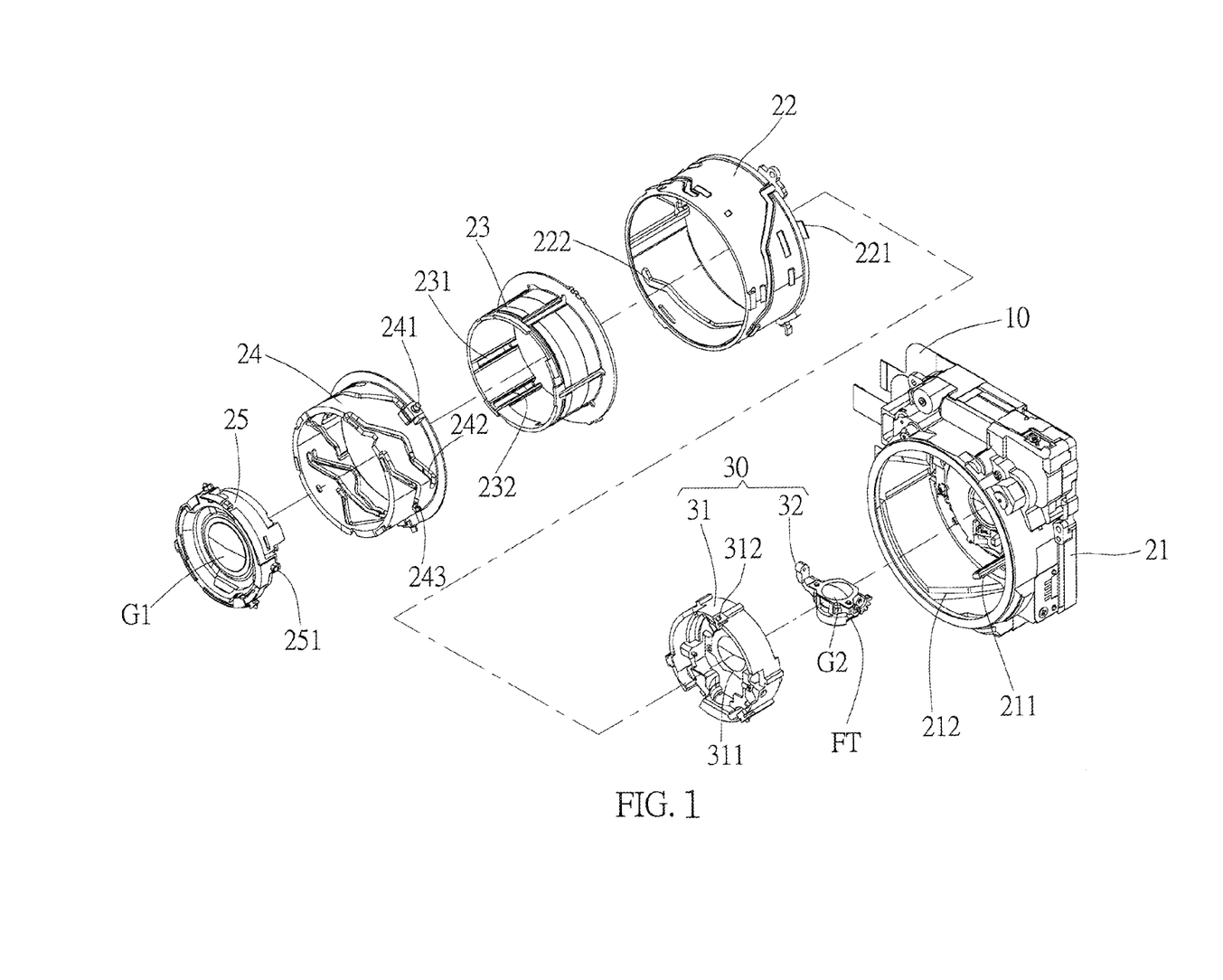
FIG. 1 is an exploded view of the lens module of a preferred embodiment of the present invention.

The image sensing device 10 receives an optical signal, and converts it into an electric signal accordingly. In the preferred embodiment, the image sensing device 10 is a complementary metal-oxide-semiconductor (CMOS), but this is not a limitation of the present invention. In other embodiments, the image sensing device 10 is a charge-coupled device (CCD) or other components which are able to receive the optical signal to convert it into the electric signal.

The driving device is provided in front of the image sensing device 10, wherein the driving device includes a first lens barrel 21, a second lens barrel 22, a third lens barrel 23, a fourth lens barrel 24, and a fifth lens barrel 25 for the optical signal passing through. The first lens barrel 21 has a rod 211 therein, and an inner side of the first lens barrel 21 has three separated rails 212 thereon. The second lens barrel 22 is provided in the first lens barrel 21, wherein an outer side of the second lens barrel 22 has three separated bumps 221 thereon, which are respectively engaged with the rails 212 of the first lens barrel 21, and can be driven by a motor (not shown) to reciprocate in the rails 212 of the first lens barrel 21. In addition, an inner side of the second lens barrel 22 has three separated cam grooves 222. The third lens barrel 23 is provided in the first lens barrel 21 with a part thereof in the second lens barrel 22. A wall of the third lens barrel 23 has three separated first straight slots 231 and three second straight slots 232 thereon. The fourth lens barrel 24 is provided in the second lens barrel 22, and between the second lens barrel 22 and the third lens barrel 23. An outer side of the fourth lens barrel 24 has three guide shafts 241 thereon, which are respectively received in the cam grooves 222 to make the fourth lens barrel 24 relative movable to the second lens barrel 22 along the cam grooves 222. In addition, a wall of the fourth lens barrel 24 has three separated first guide slots 242 and three second guide slots 243 thereon, which are respectively corresponding to the first straight slots 231 and the second straight slots 232 of the third lens barrel 23. An outer side of the fifth lens barrel 25 has three shafts 251 thereon, which respectively pass through the second guide slots 243 and then received in the second straight slots 232 of the third lens barrel 23.

Figure 3:
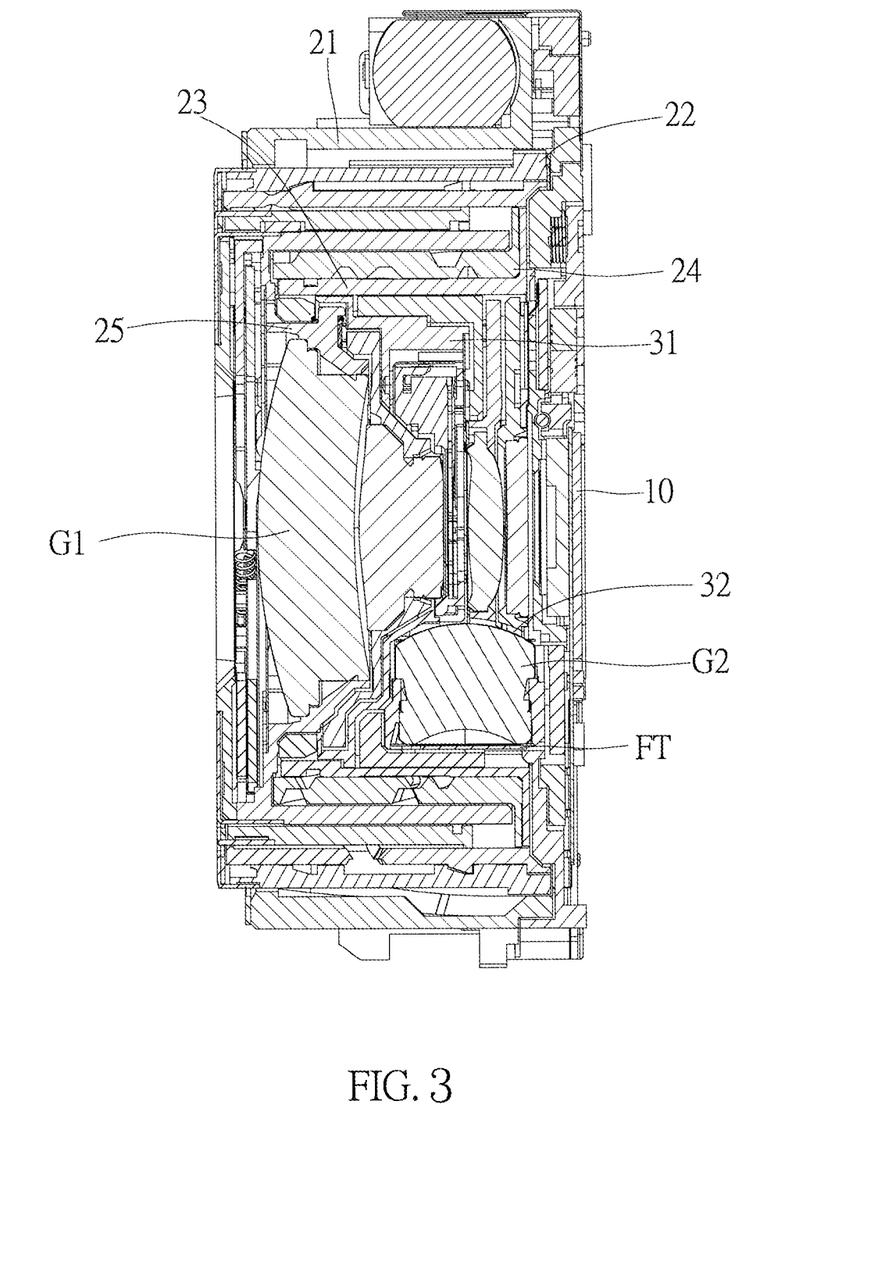
FIG. 3 is a sectional view along the line A-A in FIG. 2.
Figure 5:
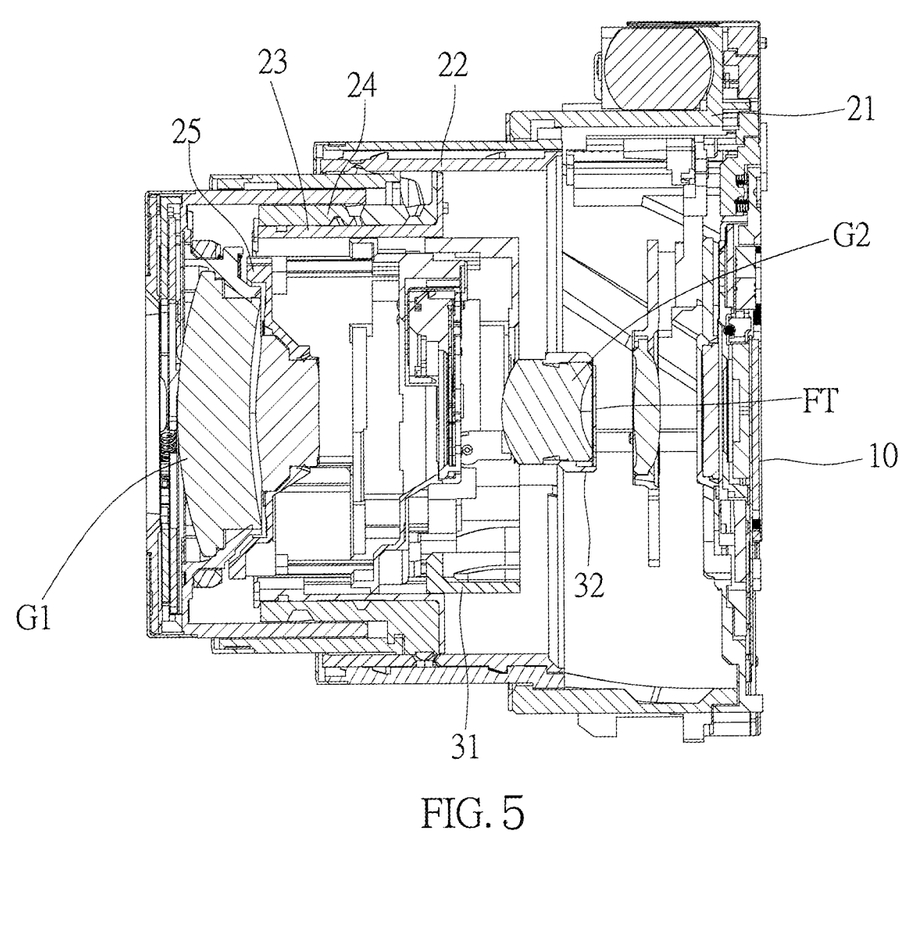
FIG. 5 is a sectional view along the line B-B in FIG. 4.
Figure 6:
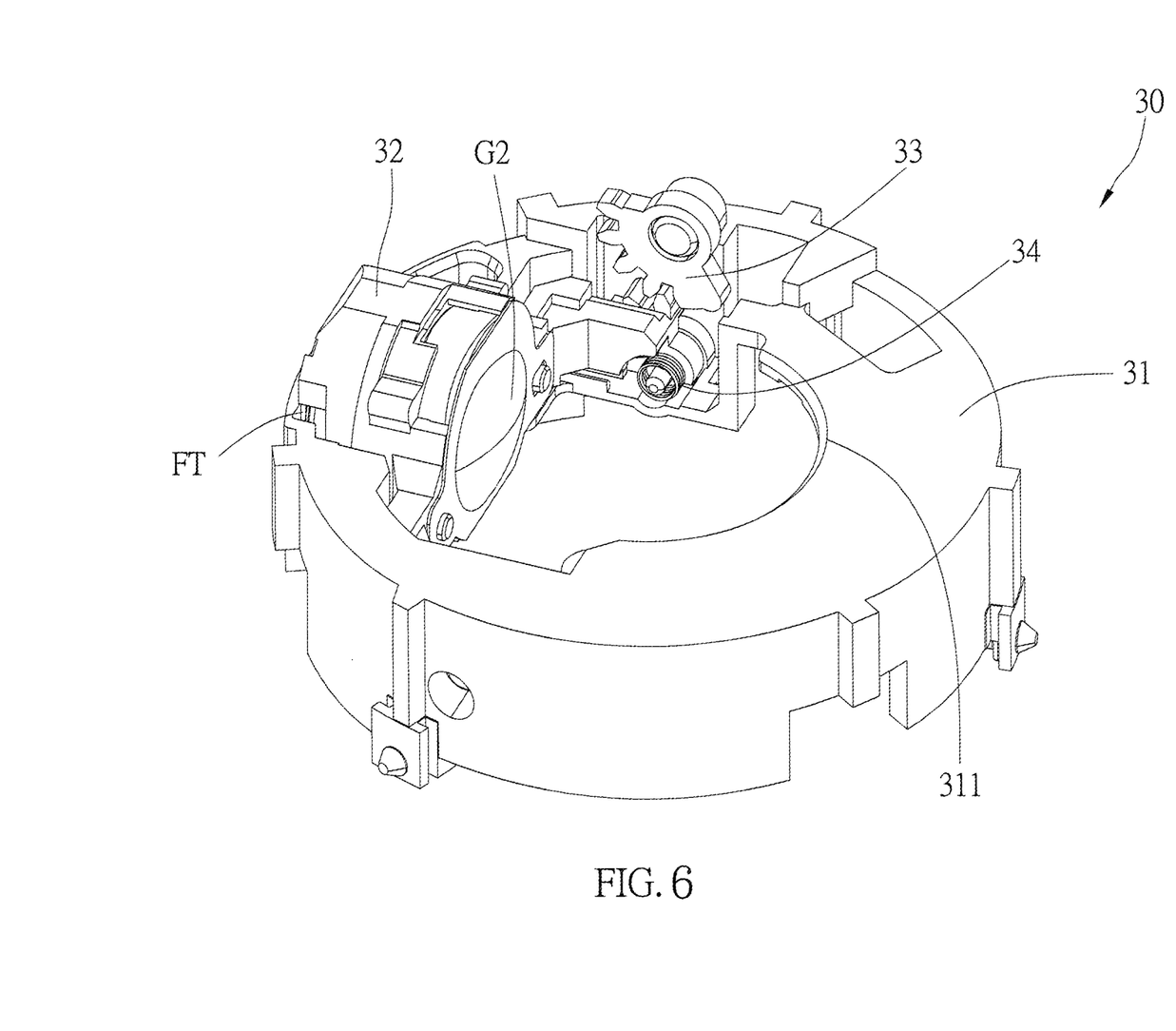
FIG. 6 is a schematic diagram showing the lens group frame at the first position.
Figure 7:
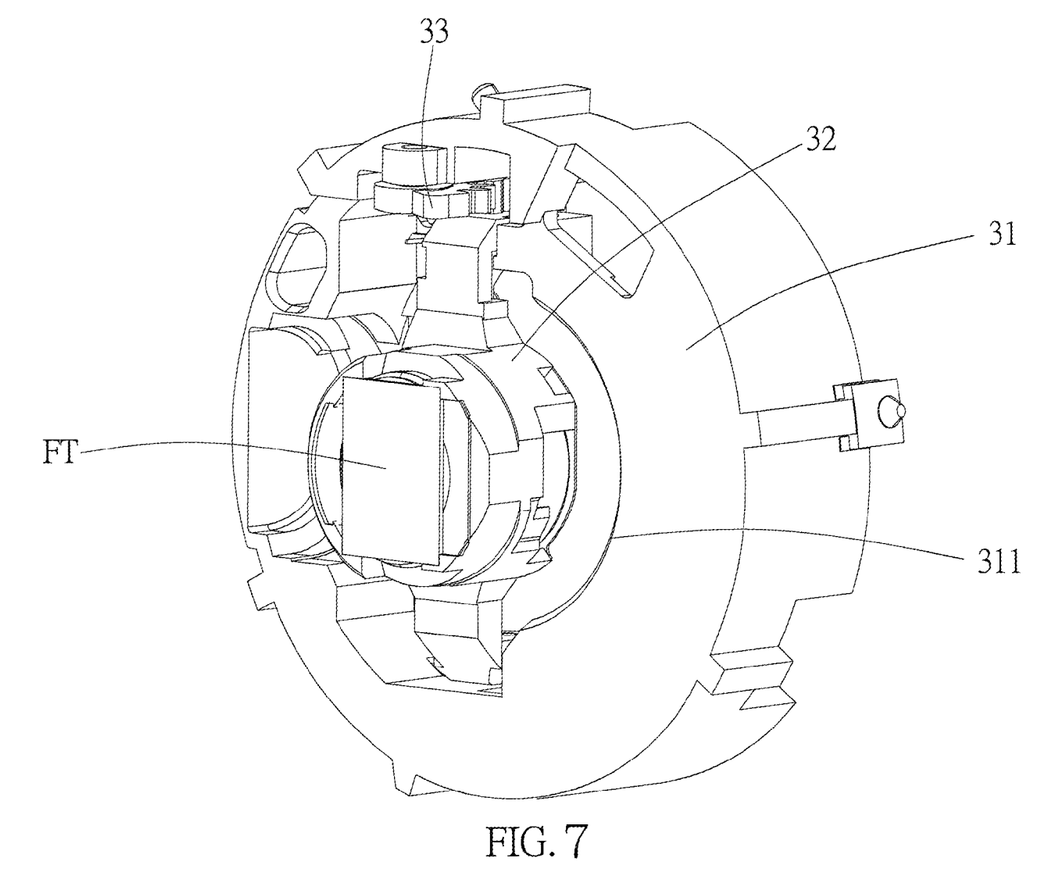
FIG. 7 is a schematic diagram showing the lens group frame at the second position.

The lens group frame 30 is provided in the fourth lens barrel 24, wherein the lens group frame 30 has a main body 31, a lens holder 32, a gear set 33, and a torsion spring 34. The main body 31 has an opening 311 at its center, which is precisely aligned with the image sensing device 10 behind the driving device. In addition, an outer side of the main body 31 has three separated protrusion shafts 312 thereon, which respectively pass through the first guide slots 242 and then received in the first straight slots 231 of the third lens barrel 23 to make the main body 31 drivable. More specifically, the main body 31 can be driven to move back and forth between a first position (as shown in FIG. 3) and a second position (as shown in FIG. 5) in the fourth lens barrel 24 along the first straight slots 231 and the first guide slots 242. The lens holder 32 is pivotally provided on the main body 31, wherein the lens holder 32 can be pivotally swung between a third position (as shown in FIG. 6) and a fourth position (as shown in FIG. 7) on the main body 31 as the main body 31 is moved back and forth between the first position and the second position. In more details, when the lens holder 32 is at the third position, it is deviated from the opening 311; and when the lens holder 32 is at the fourth position, it is precisely aligned with the opening 311. The gear set 33 is provided at where the lens holder 32 is hinged with the main body 31, and is connected to the lens holder 32. An end of the torsion spring 34 urges the main body 31, and another end thereof urges the lens holder 32. Therefore a force is provided by the torsion spring 34 to urge the lens holder 32 toward the fourth position from the third position.

The first lens group G1 is fixed on the fifth lens barrel 25, and can be moved simultaneously with the fifth lens barrel 25. The second lens group G2 is provided on the lens holder 32 of the lens group frame 30. The infrared filter FT is provided on the lens holder 32, and is closer to the image sensing device 10 than the second lens group G2.

Whereby, the second lens barrel 22 is driven by the motor to move along the rails 212, which is somewhat in a spiral way. In other words, the second lens barrel 22. Consequently, the fourth lens barrel 24 is moved along the cam grooves 222, and therefore the fourth lens barrel 24 is either getting closer or moving away from the first lens barrel 21. Furthermore, the main body 31 of the lens group frame 30 can be guided by the first guide slots 242 to move back and forth between the first position and the second position along the first straight slots 231 of the third lens barrel 23. As a result, the lens module can be switched between a collapsing state (as shown in FIG. 2, where the lens module is collapsed) and an extension state (as shown in FIG. 4, where the lens module extends out).

Figure 2:
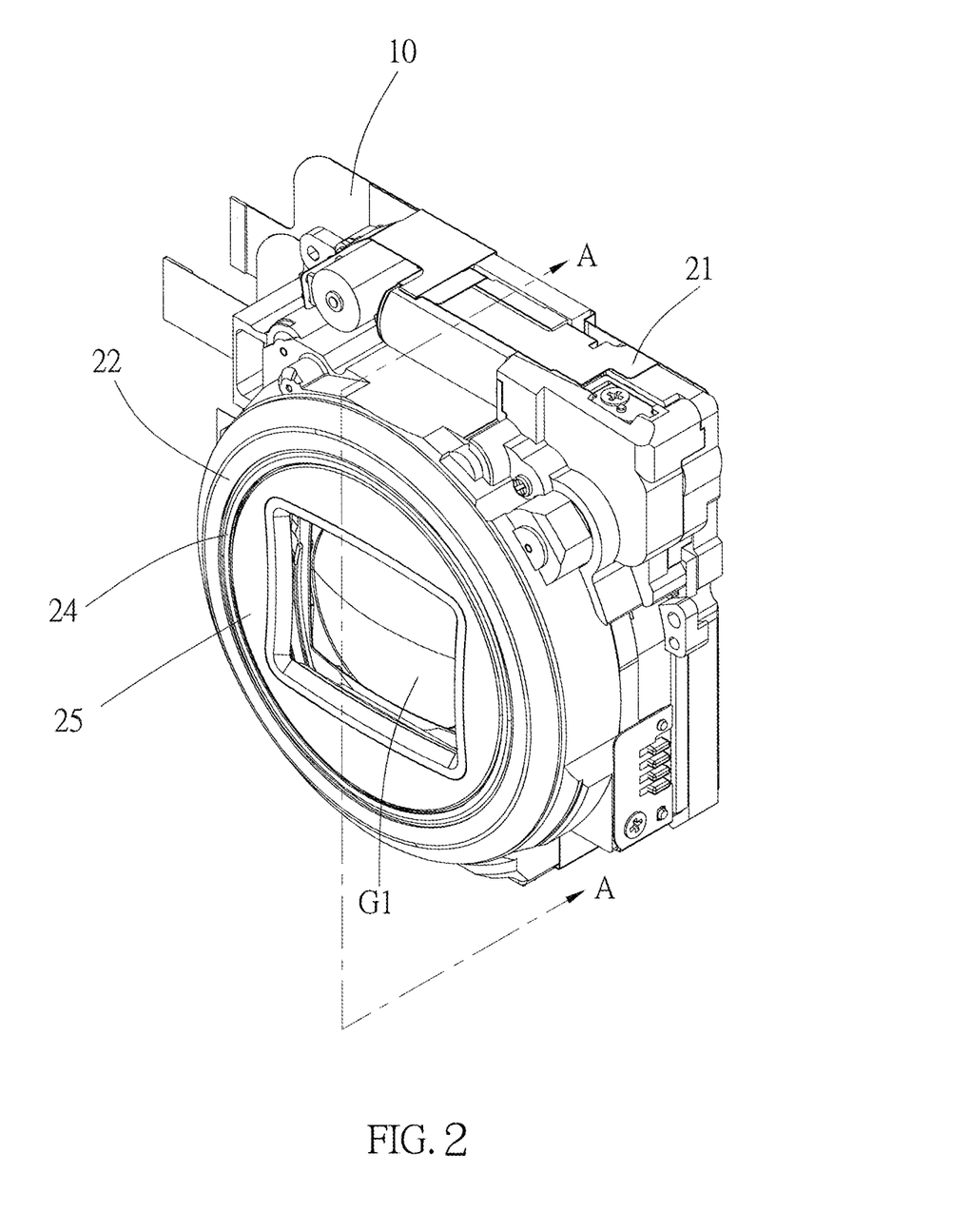
FIG. 2 is a schematic diagram showing the lens module in the collapsing state.
Figure 4:
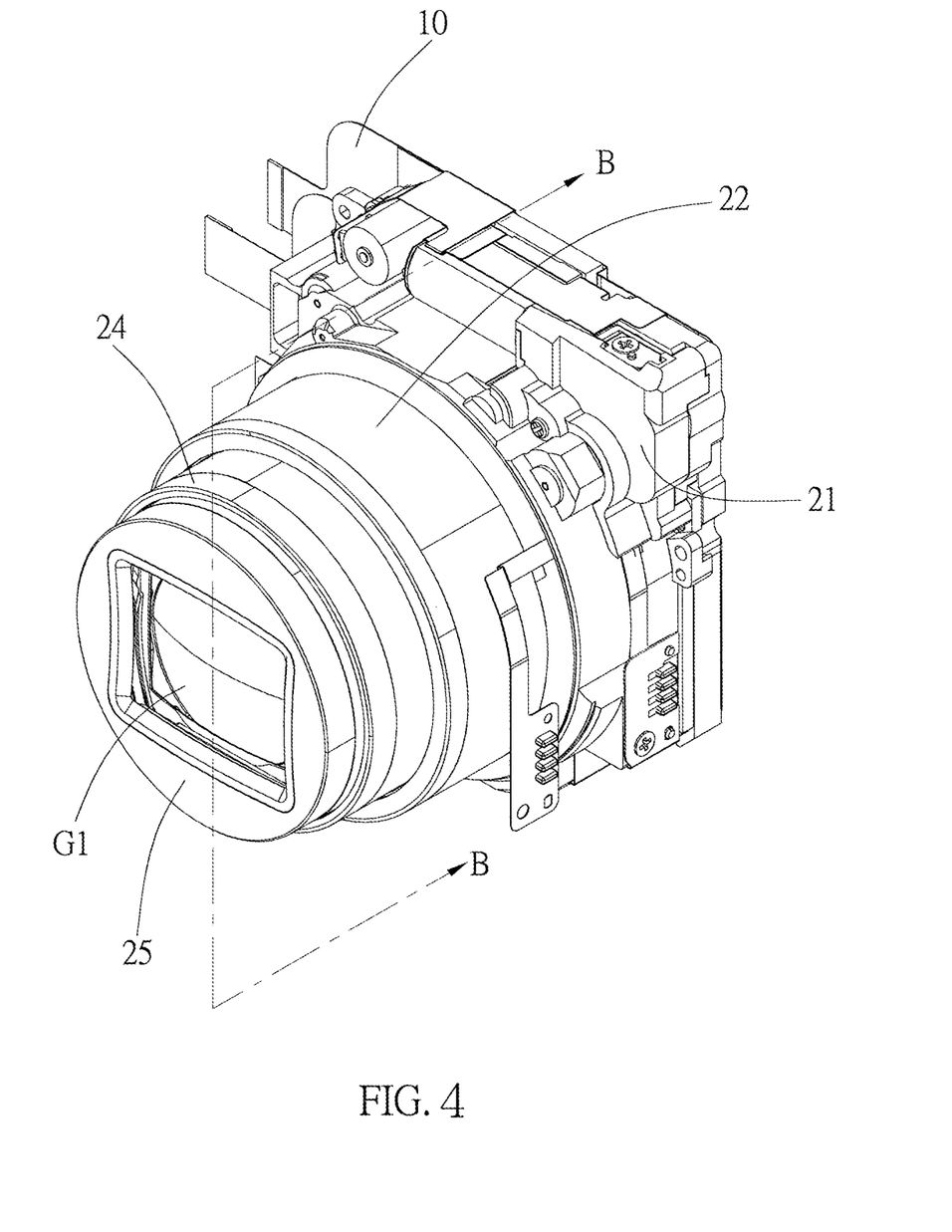
FIG. 4 is a schematic diagram showing the lens module in the extension state.

In addition, when the lens module is switched from the collapsing state (as shown in FIG. 2 and FIG. 3) to the extension state (as shown in FIG. 4 and FIG. 5), the main body 31 of the lens group frame 30 is driven to move toward the second position from the first position. Meanwhile, the lens holder 32 is swung to the fourth position from the third position with the force provided by the torsion spring 34 to precisely align the second lens group G2 and the infrared filter FT with the opening. Therefore, the second lens group G2 and the infrared filter FT are aligned with each other, and together aligned with the image sensing device 10 as well. The infrared filter FT is between the second lens group G2 and the image sensing device 10.

In this way, the focal length of the lens module can be adjusted by moving the lens group frame 30, and the optical features of the optical signal passing through the lens barrels 21-25 are changed accordingly to successfully focus the optical signal onto the image sensing device 10. In addition, infrared rays within the optical signal projected to the image sensing device 10 can be filtered out with the infrared filter FT, which further enhances the optical performance of the lens module.

Figure 8:
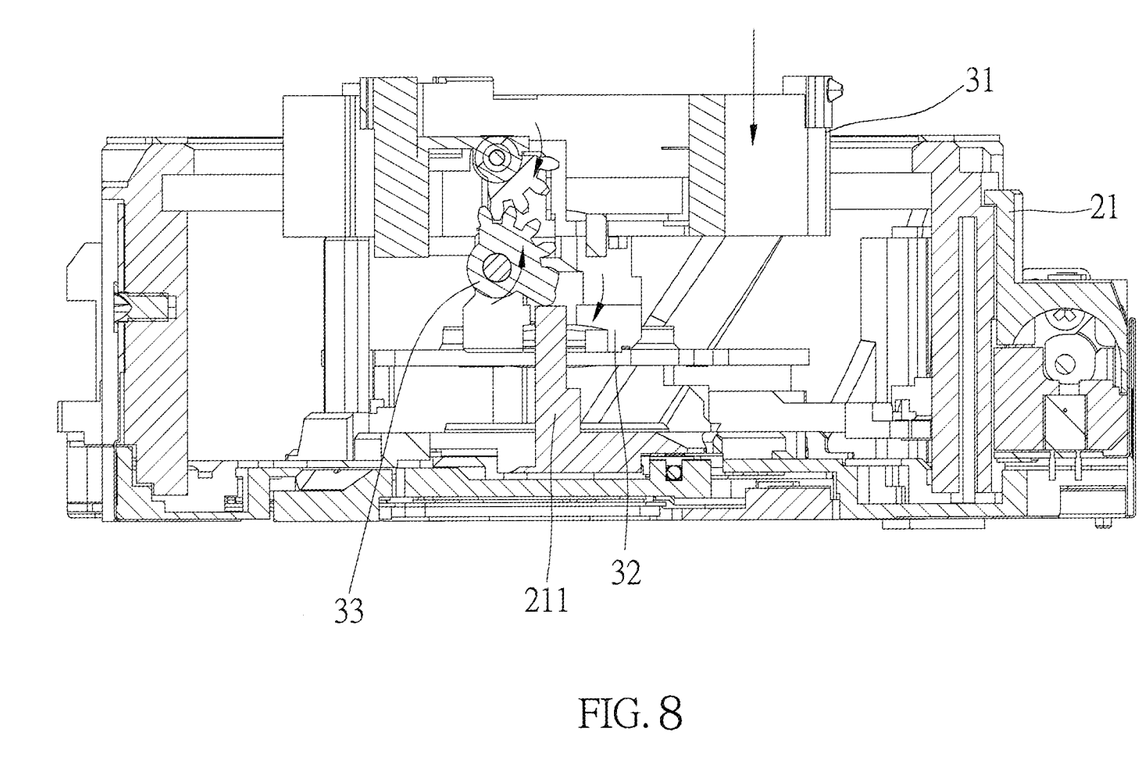
FIG. 8 is a schematic diagram showing the motion of the lens group frame while the lens module is transiting from the extension state to the collapsing state.

In addition, when the lens module is switched from the extension state (as shown in FIG. 4 and FIG. 5) to the collapsing state (as shown in FIG. 2 and FIG. 3), the main body 31 of the lens group frame 30 is driven to move gradually toward the first position from the second position. Meanwhile, as shown in FIG. 8, the rod 211 of the first lens barrel 21 abuts against the gear set 33, and pushes the gear set 33 to rotate. The lens holder 32 is therefore driven by the gear set 33 to pivotally swing back to the third position from the fourth position. After that, the lens holder 32 is restricted from leaving the third position, for the rod 211 keeps abutting against the gear set 33.

With the aforementioned way of pivotally swing the lens holder 32, the lens module can stagger the main body 31 of the lens group frame 30 and the second lens group G2 (with the infrared filter FT too) in the collapsing state. Therefore, the thickness of the lens module is reduced after being collapsed, and the purpose of designing miniature optical image devices can be achieved.

It is worth mentioning that, though the infrared filter FT is between the second lens group G2 and the image sensing device 10 in the preferred embodiment, it can be provided among the second lens group G2, or, the second lens group G2 can be provided between the infrared filter FT and the image sensing device 10 in other embodiments. All the arrangements have the same function of filtering out the infrared rays, and can equally reduce the thickness of the collapsed lens module.

It must be pointed out that the embodiments described above are only some preferred embodiments of the present invention. All equivalent structures and methods which employ the concepts disclosed in this specification and the appended claims should fall within the scope of the present invention.

What is claimed is:

1. A lens module, comprising:
 a driving device having at least one lens barrel which allows an optical signal to pass through;
 an image sensing device provided on a side of the driving device, wherein the image sensing device is on a path of the optical signal to convert the optical signal into an electric signal accordingly;
 a lens group frame provided in the lens barrel, wherein the lens group frame has a main body, which is driven by the driving device to be moved between a first position and a second position, and a lens holder pivotally connected to the main body; the lens holder is moved between a third position and a fourth position as the main body is moved between the first position and the-second position; and
 an infrared filter provided on the lens holder, wherein when the lens holder is at the fourth position, the infrared filter is precisely located on the path of the optical signal to filter out infrared rays within the optical signal which is projected to the image sensing device.

2. The lens module of claim 1, wherein the lens group frame further has a torsion spring, which has opposite ends urging the main body and the lens holder respectively to provide a force to urge the lens holder from the third position to the fourth position in a curved path.

3. The lens module of claim 1, wherein the driving device further has a rod; the lens group frame has a gear set provided at where the lens holder pivotally connected to the main body; when the main body of the lens group frame is moved to the first position from the second position, the rod abuts against the gear set to rotate the gear set to swing the lens holder from the fourth position back to the third position.

4. The lens module of claim 3, wherein when the main body of the lens group frame is at the first position, the rod keeps abutting against the gear set to restrict the lens holder from leaving the third position.

5. The lens module of claim 1 further comprising at least one lens provided on the lens holder; when the lens holder is at the fourth position, the at least one lens is precisely located on the path of the optical signal, and the infrared filter is between the at least one lens and the image sensing device.

6. The lens module of claim 1, further comprising at least one lens provided on the lens holder; when the lens holder is at the fourth position, the at least one lens is precisely aligned with the image sensing device, and the at least one lens is between the infrared filter and the image sensing device.

7. The lens module of claim 1, wherein the main body of the lens group frame has an opening which is precisely aligned with the image sensing device; when the lens holder is at the third position, the infrared filter is deviated from the opening, and when the lens holder is at the fourth position, the infrared filter is precisely aligned with the opening.

8. The lens module of claim 1, further comprising a plurality of lenses provided on the lens holder, and the infrared filter is between two of the lenses; when the lens holder is at the fourth position, the lenses are precisely aligned with the image sensing device.

9. The lens module of claim 1, wherein the driving device includes a first lens barrel, a second lens barrel, a third lens barrel, a fourth lens barrel, and a fifth lens barrel which allow the optical signal to pass through; the second lens barrel is provided in the first lens barrel, and can be driven by a motor to reciprocate in the first lens barrel; the third lens barrel is provided in the first lens barrel with a part thereof in the second lens barrel; the fourth lens barrel is provided in the second lens barrel to be located between the second lens barrel and the third lens barrel, and is movable relative to the second lens barrel; the fifth lens barrel is provided in the fourth lens barrel; the lens group frame is provided in the fourth lens barrel, and can be moved back and forth between a first position and a second position in the fourth lens barrel.

10. The lens module of claim 9, wherein the first lens barrel has a rail on an inner side thereof, and the second lens barrel has a bump on an outer side thereof to be engaged with the rail of the first lens barrel; the bump can be driven by the motor to reciprocate in the rail, which makes the second lens barrel reciprocate in the first lens barrel.

11. The lens module of claim 9, wherein the second lens barrel has a can groove on an inner side thereof; the fourth lens has a guide shaft on an outer side thereof to be received in the can groove of the second lens barrel; which makes the fourth lens barrel relative movable to the second lens barrel along the cam groove.

12. The lens module of claim 9, wherein the third lens barrel has a first straight slot on a wall thereof, and the fourth lens barrel has a first guide slot on a wall thereof to correspond to the first straight slot of the third lens barrel; the main body has a protrusion shaft on an outer side thereof to pass through the first guide slot of the fourth lens barrel and to be received in the first straight slot of the third lens barrel, which makes the main body movable back and forth in the fourth lens barrel along the first straight slot and the first guide slot.

13. The lens module of claim 9, wherein the third lens module has a second straight slot on the wall thereof, and the fourth lens barrel has a second guide slot on the wall thereof to correspond to the second straight slot of the third lens barrel; the fifth lens barrel has a shaft on an outer side of the fifth lens barrel thereof to pass through the second guide slot of the fourth lens barrel and to be received in the second straight slot of the third lens barrel, which makes the fifth lens barrel movable back and forth in the fourth lens barrel along the second straight slot and the second guide slot.

* * * * *